US008514982B2

(12) United States Patent
Dubash et al.

(10) Patent No.: US 8,514,982 B2
(45) Date of Patent: Aug. 20, 2013

(54) SYSTEMS AND METHODS FOR DIGITIZING MULTIPLE CHANNELS IN A RECEIVER

(75) Inventors: Noshir Dubash, Chandler, AZ (US); Siva Bonasu, Phoenix, AZ (US); Peter Naji, Tempe, AZ (US); Douglas W. Schucker, Gilbert, AZ (US)

(73) Assignee: CSR Technology, Inc, Sunnyvale, CA (US)

( * ) Notice: Subject to any disclaimer, the term of this patent is extended or adjusted under 35 U.S.C. 154(b) by 1049 days.

(21) Appl. No.: 12/333,846

(22) Filed: Dec. 12, 2008

(65) Prior Publication Data

US 2010/0150275 A1 Jun. 17, 2010

(51) Int. Cl.
*H04L 27/06* (2006.01)

(52) U.S. Cl.
USPC ........... 375/340; 329/315; 332/117; 342/128; 342/200; 359/278; 359/287; 367/101; 398/187

(58) Field of Classification Search
None
See application file for complete search history.

(56) References Cited

U.S. PATENT DOCUMENTS 7,526,254 B2 * 4/2009 Toporski ......................... 455/45
2007/0085718 A1 * 4/2007 Axness et al. ................ 341/143
2008/0250460 A1 * 10/2008 Khoini-Poorfard et al. .... 725/70

* cited by examiner

*Primary Examiner* — Adolf Dsouza
(74) *Attorney, Agent, or Firm* — Minh N. Nguyen, Esq.; Next IP Law Group LLP

(57) ABSTRACT

Systems and methods for mitigating multipath signals in a receiver are provided. In this regard, a representative system, among others, includes a radio frequency (RF) front-end and at least one analog-to-digital converter (ADC). The RF front-end receives FM signals and down-converts the received frequency signals to intermediate frequency (IF) signals. The analog-to-digital converter (ADC) receives the intermediate frequency signals and digitizes multiple FM channels around a desired FM channel associated with the down-converted signals. The system further includes multiple sets of digital processing components that are configured to simultaneously receive and process the digitized multiple channels. The multiple sets of digital processing components include at least two parallel channel selection and demodulation paths in which the respective digitized multiple channels are processed therethrough.

17 Claims, 8 Drawing Sheets

SYSTEMS AND METHODS FOR DIGITIZING MULTIPLE CHANNELS IN A RECEIVER

TECHNICAL FIELD

The present disclosure is generally related to receivers and, more particularly, is related to systems and methods for digitizing multiple channels in a frequency modulation (FM) receiver.

BACKGROUND

Traditional broadcast FM radio receivers use discrete analog intermediate frequency (IF) filters for selecting and filtering the desired signal, and analog demodulators that demodulate the FM signal in order to extract the audio signal. These receivers are typically analog and their performance is determined by the precision and variability of the analog components.

Advances in complementary metal-oxide-semiconductor (CMOS) fabrication and digital signal processing (DSP) technology have made channel filtering and frequency modulation (FM) demodulation possible in the digital domain. Some integrated FM receivers use digital filters for channel selection, digital FM demodulation and an analog-to-digital converter (ADC) for facilitating digitization of the down-converted IF signal within a single channel bandwidth. The FM channel for a single radio station can be 150 kilohertz (KHz) wide, determined by the maximum FM deviation of ±75 kHz. The ADC can have a 150 kHz pass band, centered at the IF frequency. The receiver front-end and the ADC provide some filtering but the majority of the channel filtering is done by the digital channel-select filter. The filtered single channel is then demodulated digitally.

SUMMARY

Systems and methods for digitizing multiple channels in a receiver are provided. In this regard, a representative system, among others, includes a radio frequency (RF) front-end and at least one analog-to-digital converter (ADC). The RF front-end receives FM signals and down-converts the received frequency signals to intermediate frequency (IF) signals. The analog-to-digital converter (ADC) receives the intermediate frequency signals and digitizes multiple FM channels around a desired FM channel associated with the down-converted signals. The system further includes multiple sets of digital processing components that are configured to simultaneously receive and process the digitized multiple channels. The multiple sets of digital processing components include at least two parallel channel selection and demodulation paths in which the respective digitized multiple channels are processed therethrough.

A representative method, among others, for digitizing multiple channels in a receiver, comprising: receiving FM signals; down-converting the received FM frequencies to intermediate frequency signals; digitizing multiple channels around a desired channel associated with the down-converted signals; and simultaneously processing the digitized multiple channels using at least two parallel channel selection and demodulation paths in which the respective digitized multiple channels are processed therethrough.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which radio frequency (RF) signals are digitized into multiple channels, particularly frequency modulated (FM) RF signals. Multiple channel digitization enables simultaneous digital processing of channels which can be exploited to provide many advantages and applications. For example, a multi-channel FM receiver can have multiple audio streams available simultaneously. A user could listen to one FM station while recording audio in digital format from another station. There may be other applications for multiple audio channels that have not been thought of yet, since this capability is currently not believed to be available.

Figure 1:
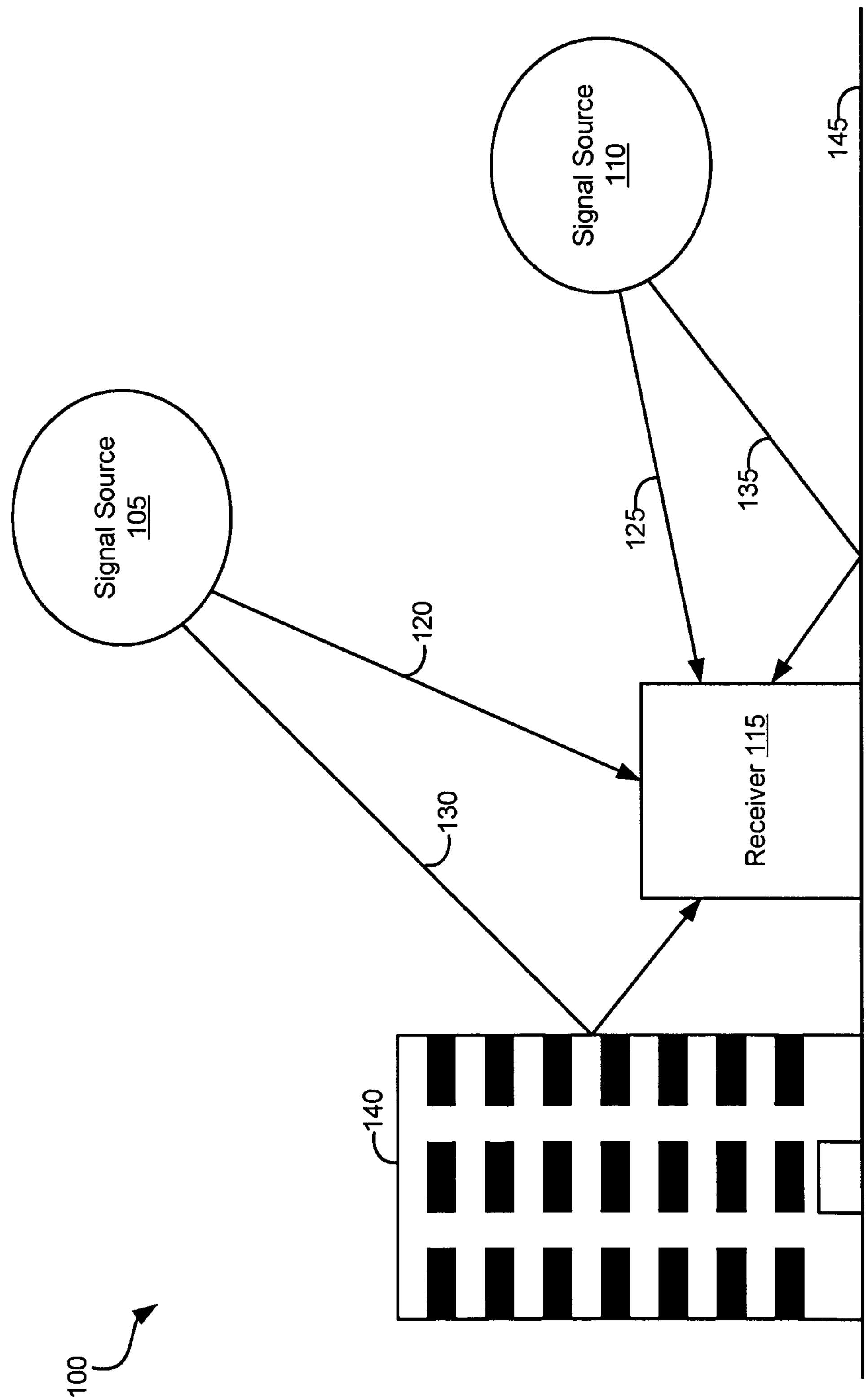
FIG. 1 is an overview of a system that digitizes multiple channels in a receiver.

FIG. 1 is an overview of a system 100 that digitizes multiple channels in a receiver 115. The system 100 comprises a plurality of signal sources 105, 110 and the receiver 115. Although only one receiver 115 is shown in the system 100, the system 100 can include multiple receivers 115. The receiver 115 includes, but is not limited to, a radio receiver and frequency modulation (FM) receiver. The signal sources 105, 110 include, but are not limited to, broadcasting stations and radio stations. The signal sources 105, 110 transmit RF signals to the receiver 115, which converts the RF signals into useful information. The transmitted RF signals from the signal sources 105, 110 reach the receiver 115 by two or more paths 120, 130, 125, 135 either directly from the signal sources 105, 105 or indirectly off a building 140 or the ground 145, respectively. The receiver 115 that can digitize multiple channels is further described in relations to FIGS. 2-8.

Figure 2:
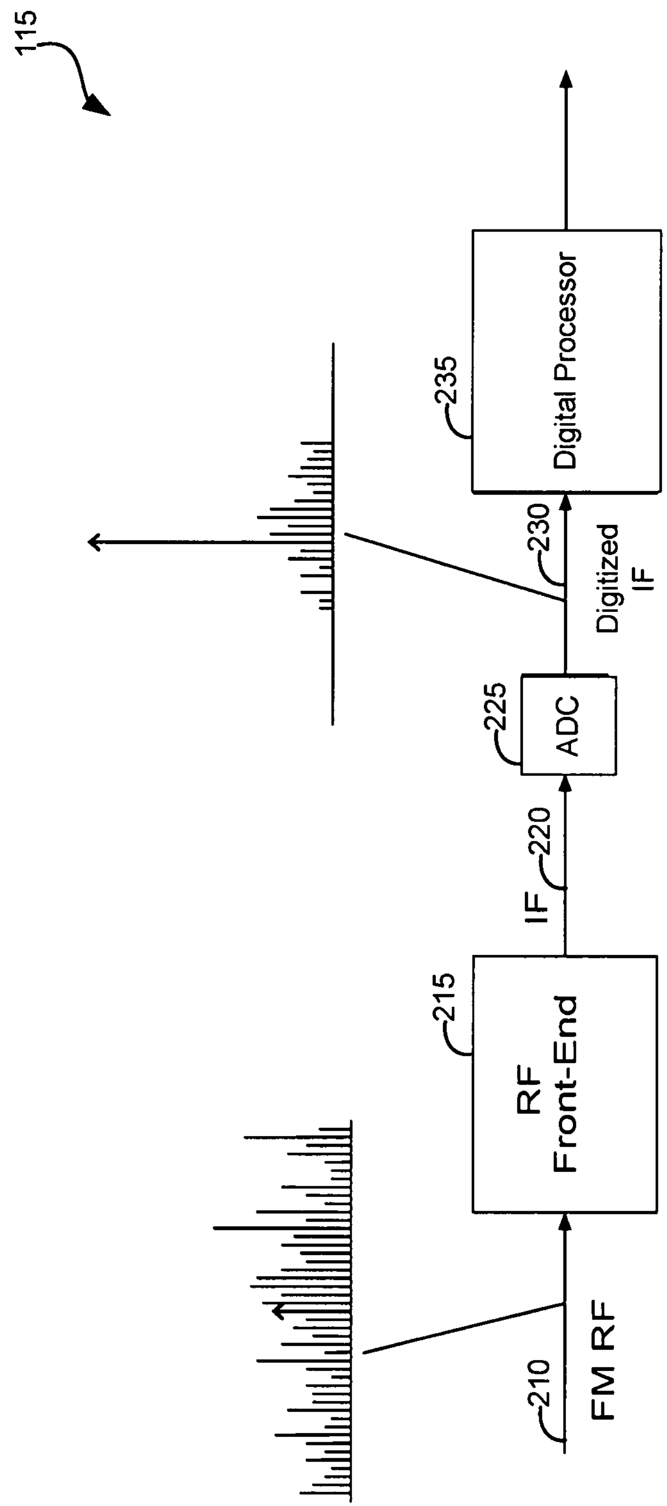
FIG. 2 is a high-level block diagram that illustrates an embodiment of the receiver, such as that shown in FIG. 1.

FIG. 2 is a high-level block diagram that illustrates an embodiment of the receiver, such as that shown in FIG. 1. In this example, the receiver 115 is an integrated FM receiver and can include, but not limited to, an antenna (not shown), an RF front-end 215, an analog-to-digital converter (ADC) 225, and a digital processor 235. The RF front-end 215 receives FM RF 210 from the antenna and down-converts the received FM RF 210 to intermediate frequency (IF) signals, which are digitized and filtered by the ADC 225. The digitized IF 230 is sent to a digital processor 235 that is designed to facilitate digitizing multiple channels. The digital processor 235 is further described in relation to FIGS. 3-8.

Figure 3:
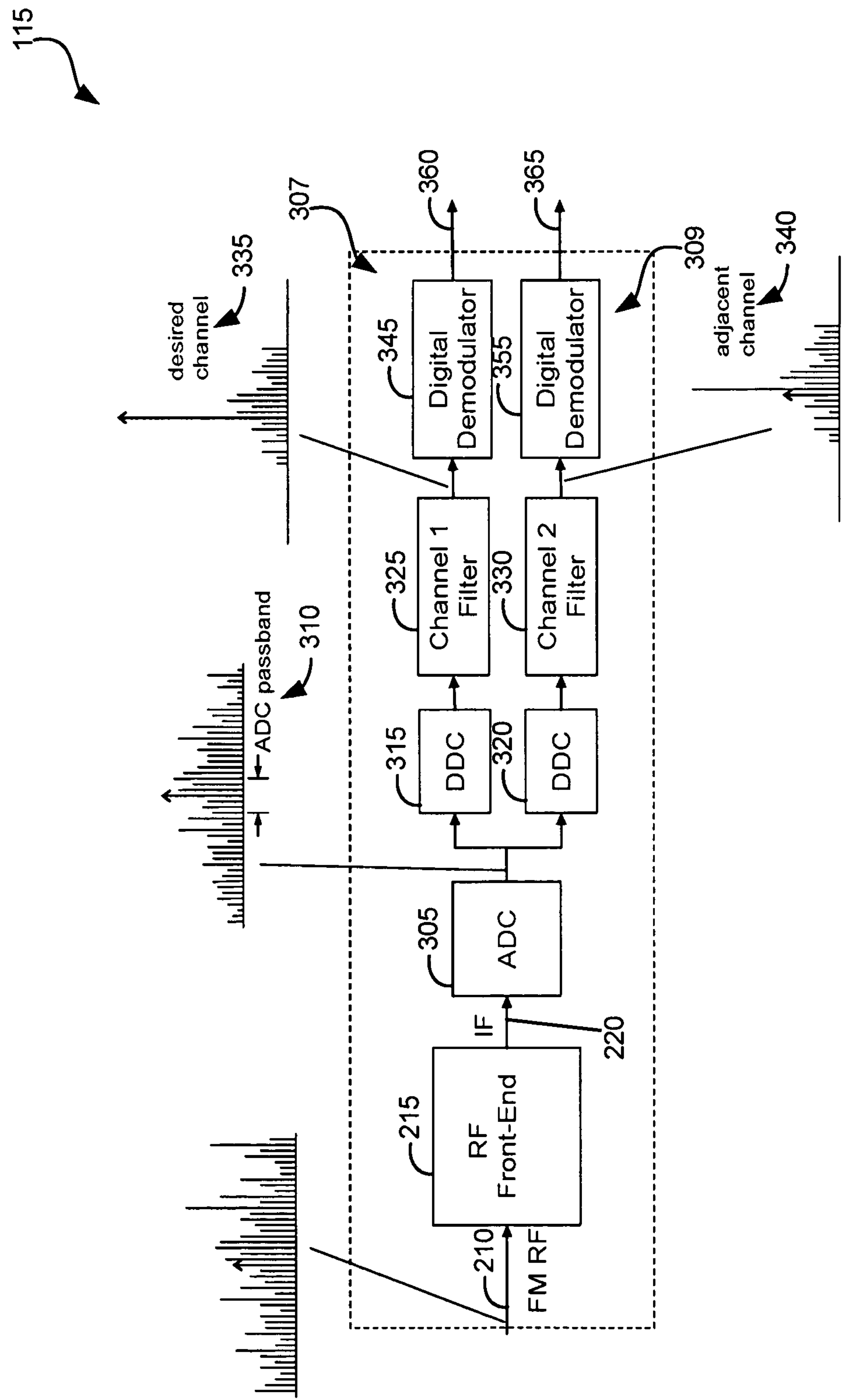
FIG. 3 is a detailed block diagram that illustrates an embodiment of the receiver, such as that shown in FIG. 2, that digitizes multiple channels.

FIG. 3 is a detailed block diagram that illustrates an embodiment of the receiver 115, such as that shown in FIG. 2, that digitizes multiple channels. Similar to FIG. 2, the receiver 115 in FIG. 3 also includes an RF front-end 215 that receives FM RF 210 from the antenna (not shown) and down-converts the received FM RF 210 to intermediate frequency (IF) signals 220. The receiver 115 includes an analog-to-digital converter (ADC) 305 that receives the intermediate frequency signals 220 and digitizes multiple FM channels 310 around a desired FM channel associated with the down-converted signals 220. The ADC 305 filters a range of frequencies centered at the intermediate frequency. For example, the ADC 305 pass band can be 1 megahertz (MHz) wide centered at the IF frequency, which can be selected to be 600 kilohertz (kHz). The ADC 305 can be an over-sampled Sigma-Delta ADC, which offers high dynamic range with minimal filtering from the RF front-end 215. The ADC 305 can further include a sigma-delta modulator and decimation filters.

The receiver 115 further includes multiple sets of digital processing components that are configured to simultaneously receive and process the digitized multiple channels. The multiple sets of digital processing components include two parallel channel selection and demodulation paths 307, 309 in which the respective digitized multiple channels are processed therethrough. The two parallel channel selection and demodulation paths 307, 309 select and demodulate any two of the digitized multiple channels.

The multiple sets of digital processing components include first and second sets of digital processing components each having a digital down-converter (DDC) 315, 320, a channel filter 325, 330 and a digital demodulator 345, 355. The digital down-converters 315, 320 select and down-convert to baseband respective first and second channels 335, 340 of the digitized multiple channels. The digital down-converters 315, 320 pass the selected first and second channel to the respective channel filters 325, 330 that remove the image and other unwanted interference on either side of the selected first and second channels. The digital demodulators 345, 355 receive the filtered first and second channels 335, 340 and demodulate information 360, 365 from the filtered first and second channels, respectively.

Figure 4:
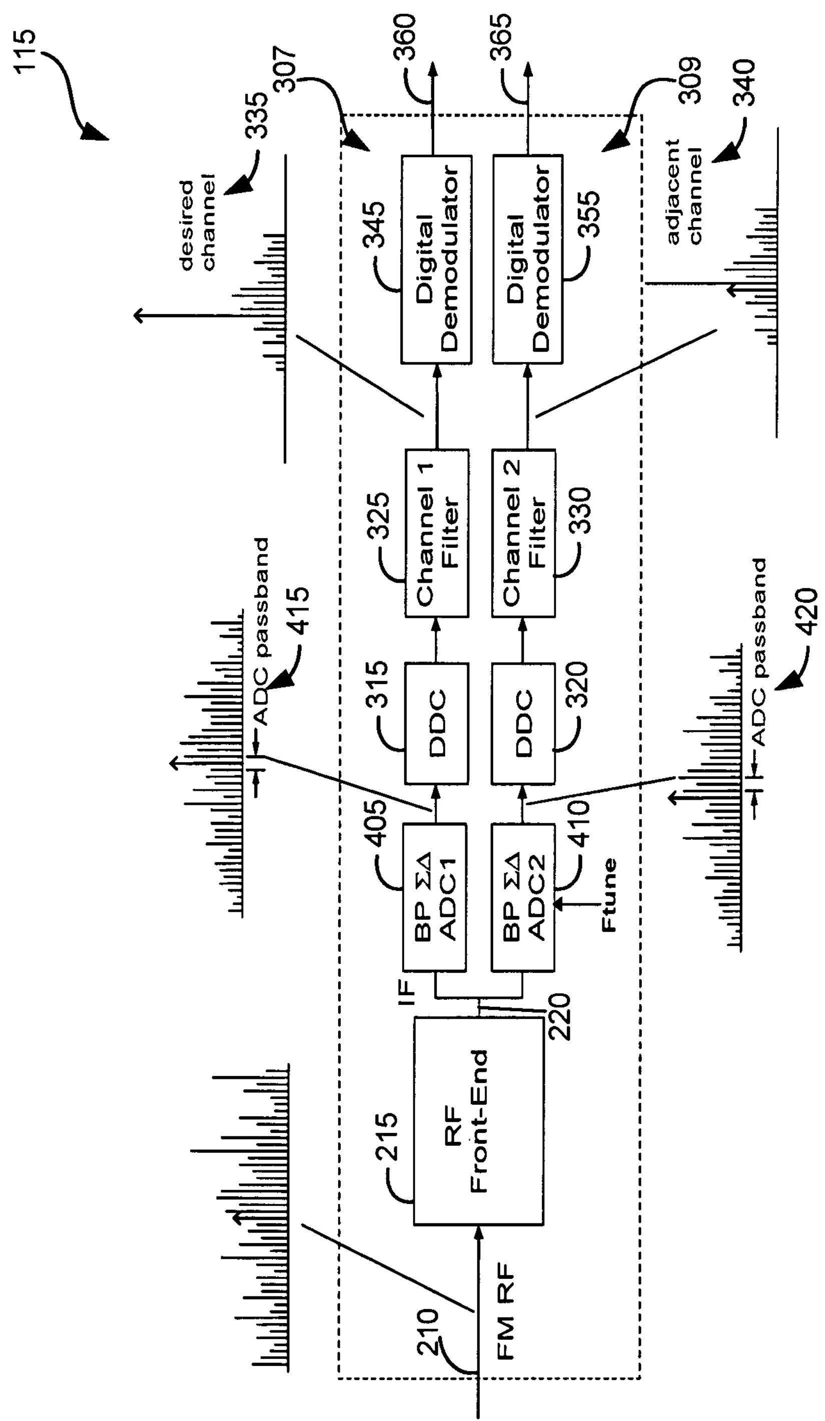
FIG. 4 is a block diagram that illustrates an embodiment of the receiver, such as that shown in FIG. 3, having narrow-band bandpass analog-to-digital converters.

FIG. 4 is a block diagram that illustrates an embodiment of the receiver 115, such as that shown in FIG. 3, having narrow-band bandpass analog-to-digital converters 405, 410. Similar to FIG. 3, the receiver 115 in FIG. 4 also includes an RF front-end 215, digital down-converters 315, 320, channel filters 325, 330, and digital demodulators 345, 355. The receiver 115, however, includes first and second narrow-band bandpass analog-to-digital converters 405, 410 that are electrically coupled to the respective digital down-converters 315, 320. The first and second narrow-band bandpass analog-to-digital converters 405, 410 tune to first and second ADC passbands 415, 420 that are processed into the first and second channels 335, 340, respectively. For example, the first and second narrow-band bandpass analog-to-digital converters 405, 410 can have a 200 kHz bandwidth with a fixed center frequency; however, the second narrow-band bandpass ADC 410 further includes a tunable center frequency. In this manner, the desired adjacent channel is digitized with desired dynamic range saving power and area in both the narrow-band bandpass analog-to-digital converters 405, 410 and the channel filters 325, 330.

Figure 5:
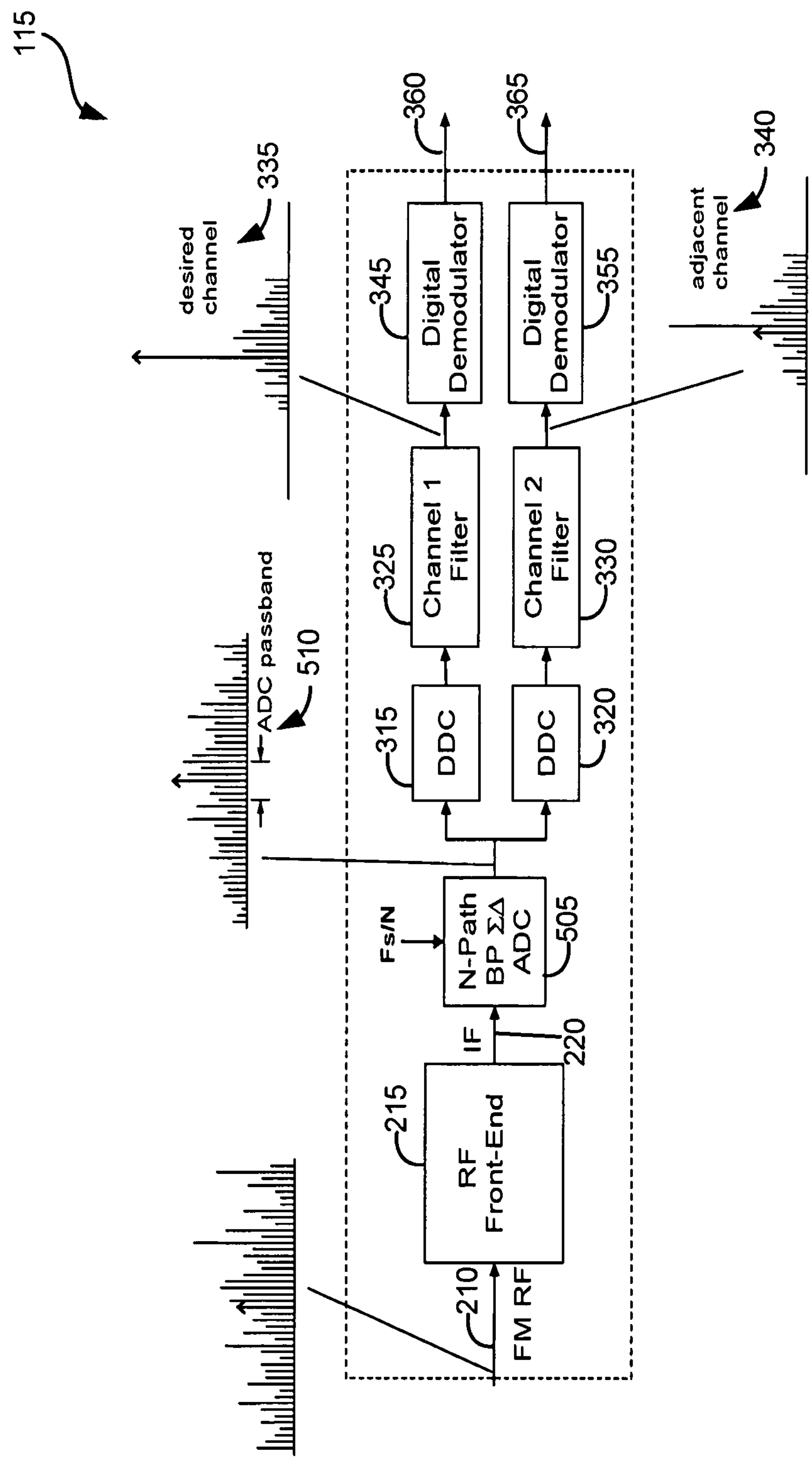
FIG. 5 is a block diagram that illustrates an embodiment of the receiver, such as that shown in FIG. 3, having an N-path bandpass analog-to-digital converter.

FIG. 5 is a block diagram that illustrates an embodiment of the receiver 115, such as that shown in FIG. 3, having an N-path bandpass analog-to-digital converter 505. Similar to FIG. 3, the receiver 115 in FIG. 5 also includes an RF front-end 215, digital down-converters 315, 320, channel filters 325, 330, and digital demodulators 345, 355. The receiver 115, however, includes an N-path bandpass ADC 505 that reduces the sampling rate of each path by N relative to the throughput of the N-path bandpass ADC 505. With this, opamp settling time and bandwidth can be relaxed in the resonators, resulting in about 1/N power and area savings. Furthermore, forgoing the power savings, the N-path bandpass ADC 505 can be pushed to even higher frequencies. The sampling frequency can be as low as twice the input signal frequency.

It should be noted that power consumption can be conserved in other ways. For example, power consumption can be critical in handset FM applications. If the power in the desired channel is above a given threshold, and the power in the adjacent and alternate channels is below a set threshold, then the quadrature channel in the receiver can be turned off to save power. The quadrature channel is used for image rejection, which reduces the receiver noise figure by approximately 3 dB by eliminating image noise, and provides rejection to adjacent channel interferers at the image frequency.

This can be easily achieved in a multi-channel receiver described above, since the receiver can scan alternate and adjacent channels periodically to determine if the quadrature channel can be used. Note that the advantages and features mentioned above would apply just as well or better in some cases to a full-band FM receiver. A full-band FM receiver is an extension of the multi-band FM receiver, where the entire broadcast FM band including all channels is digitized.

Figure 6:
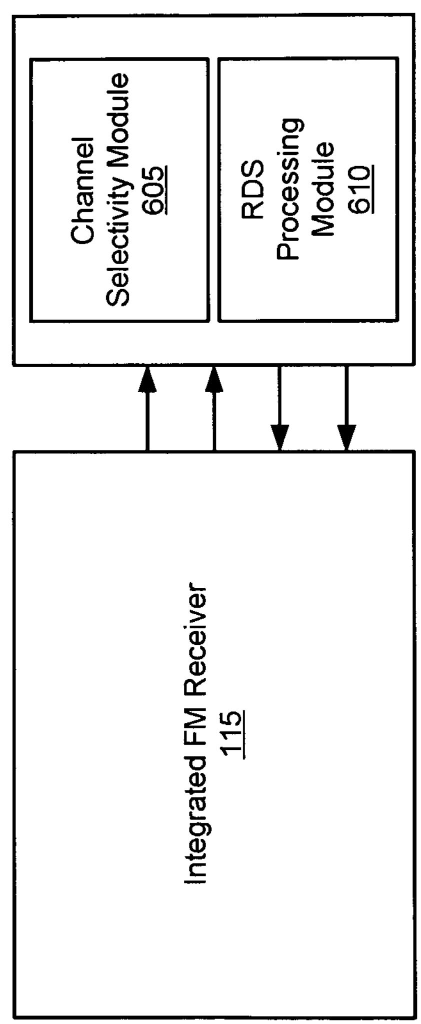
FIG. 6 is a block diagram that illustrates an embodiment of the receiver, such as that shown in FIG. 2, having channel selectivity and radio data system (RDS) processing modules.

FIG. 6 is a block diagram that illustrates an embodiment of the receiver 115, such as that shown in FIG. 2, having channel selectivity and radio data system (RDS) processing modules 605, 610. The receiver 115 digitizes multiple channels and sends the digitized multiple channels to the channel selectivity and radio data system (RDS) processing modules 605, 610 that can decode RDS data from the digitized multiple channels and provide a number of ways of enhance rejection of nearby channels as follows:

a) Identify the largest interferer: An extra channel in the digital receiver scans, for example, the four closest channels around the desired channel and calculates the RSSI of each of these neighboring channels. The largest interferer is the one with the highest RSSI.

b) Dynamically shape the channel filter to maximize rejection at the interfering frequency. This can be accomplished by reconfiguring the tap coefficients of a digital filter. It may be a simple adjustment depending on which side the highest interferer is at.

c) If the additional rejection provided by step (b) is not sufficient, active cancellation of the interfering signal can be done. The cancellation can be a closed loop or open loop process and can be done in the phase/frequency domain prior to demodulation, or in the audio domain after demodulation. The channel selectivity and radio data system (RDS) processing modules 605, 610 are further described in relation to FIGS. 7 and 8.

Figure 7:
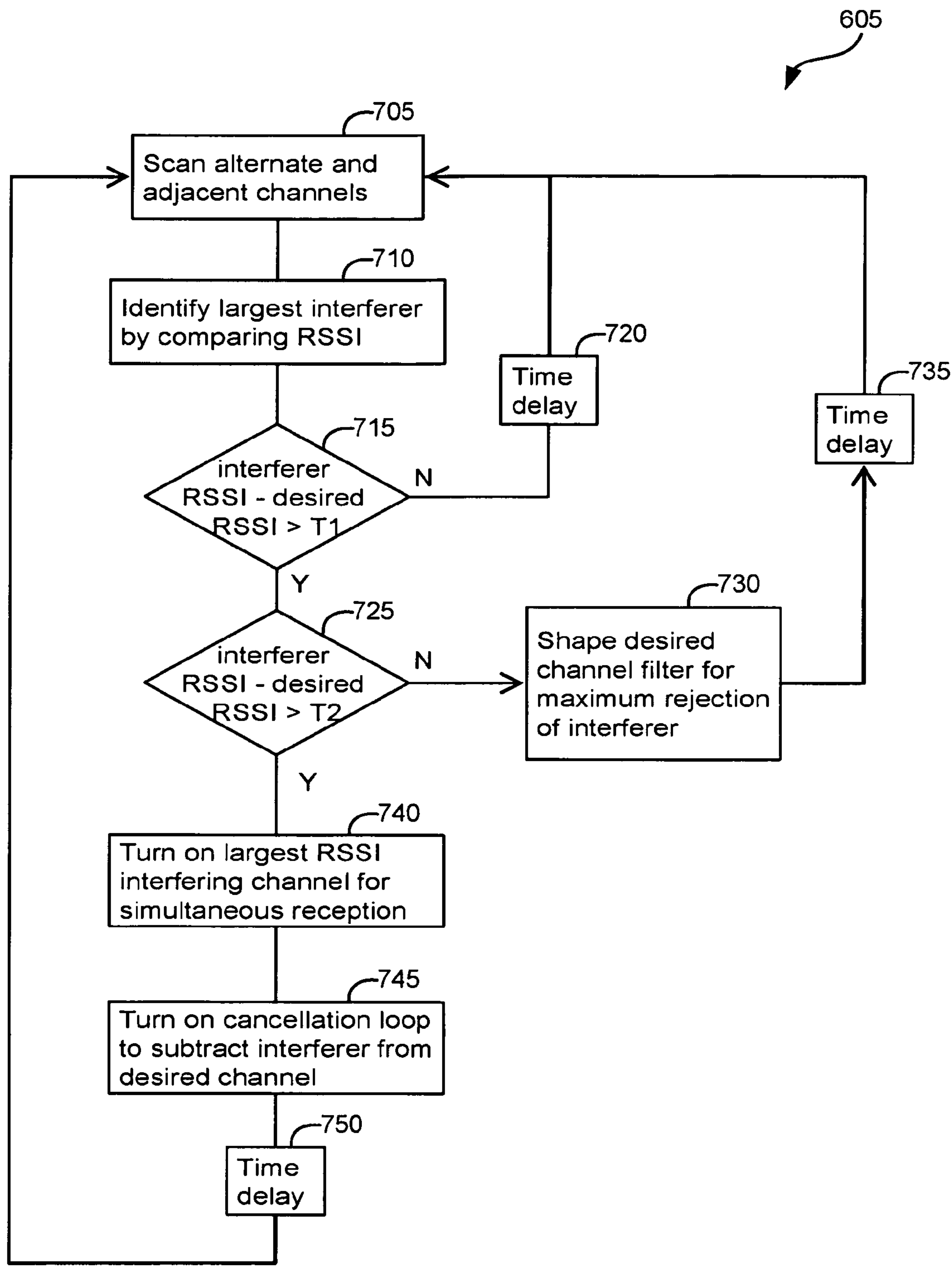
FIG. 7 is a flow diagram that illustrates an embodiment of the architecture, functionality, and/or operation of the channel selectivity module, such as that shown in FIG. 6, for channel selectivity enhancement.

FIG. 7 is a flow diagram that illustrates an embodiment of the architecture, functionality, and/or operation of the channel selectivity module 605, such as that shown in FIG. 6, for channel selectivity enhancement. At step 705, the channel selectivity module 605 scans the alternate and adjacent channels based on the received digitized multiple channels from the receiver 115 (FIG. 6). At step 710, the channel selectivity module 605 further identifies the largest interferer of the alternate and adjacent channels by, for example, comparing RSSI levels of the respective alternate and adjacent channels.

T1 and T2 are predetermined thresholds for the interferer RSSI compared to the desired signal RSSI. At step 715, if the largest interferer RSSI is very small compared to the desired signal RSSI, then the interferer RSSI minus signal RSSI should be less than T1 and the channel selectivity module 605 takes no action. In this case the interferer is determined to be low enough not to effect signal reception. At step 720, responsive to determining that the RSSI minus signal RSSI is less than T1, the channel selectivity module 605 delays a certain time before repeating step 705.

If the largest interferer power is larger so that the interferer RSSI minus signal RSSI is greater than T1 but less than T2, at step 725, then the interference is determined to be moderate and can be controlled by shaping the desired channel filter at step 730. The channel selectivity module 605, at step 735, then delays a certain time before repeating step 705. If the largest interferer power is even larger so that the interferer RSSI minus signal RSSI is greater than T2, at step 725, then the interference is determined to be high and the channel selectivity module 605 turns on the largest RSSI interfering channel for simultaneous reception and turns on the cancellation loop to subtract the interferer from the desired channel, at steps 740 and 745, respectively. The process of active cancellation generally turns on two digital channels simultaneously which can consume extra power, and thus is generally used if the interference is high. At step 750, since the interference level can be changing with time in a dynamic environment, the initial scan and algorithm is repeated at step 705 after a fixed time interval regardless of the results of the previous scan.

Figure 8:
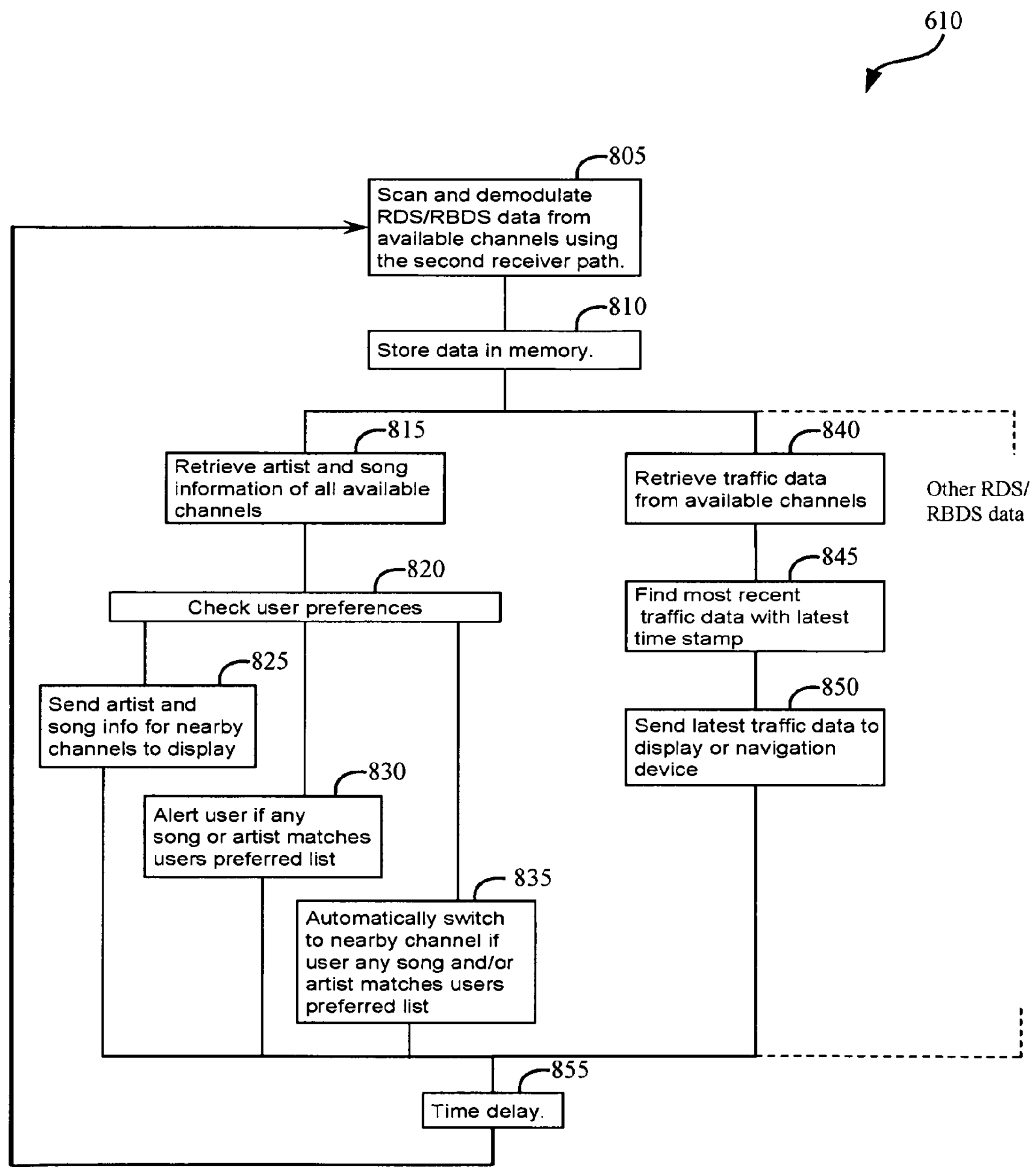
FIG. 8 is a flow diagram that illustrates an embodiment of the architecture, functionality, and/or operation of the RDS processing module, such as that shown in FIG. 6, for processing RDS data from multiple channels.

FIG. 8 is a flow diagram that illustrates an embodiment of the architecture, functionality, and/or operation of the RDS processing module 610, such as that shown in FIG. 6, for processing RDS data from multiple channels. With the increasing amount of information, including traffic information and open data channels, now available on RDS it may be advantageous to get RDS data from multiple channels. The exemplary receiver 115 described above can simultaneously decode RDS data from, e.g., 2 channels. At step 805, since RDS information changes relatively slowly, the receiver 115 could scan the RDS information from, e.g., the other 3 channels using the second channel selection and demodulation paths 309 (FIG. 3), thus having RDS data available from, e.g., five potential channels. At step 810, the RDS processing module 610 stores the RDS data in memory (not shown).

At step 815, the RDS processing module 610 retrieves artist and song information from the digitized multiple channels associated with the RDS data. At step 820, the RDS processing module 610 checks for the user preferences related to artists and songs. Based on the user preferences, the RDS processing module 610 could execute one or more of the actions at steps 825, 830 and 835, which are as follows: sending artist an song information to a text display; alerting a user if the song or artist playing on a nearby channel matches the user's preference list; and automatically switching the channel depending on the user preference, respectively.

The RDS data can further include traffic data. At steps 840 and 845, the RDS processing module 610 can retrieve traffic data from the digitized multiple channels associated with the RDS data and find the most recent traffic data with the latest time stamp, respectively. At step 850, the RDS processing module 610 sends the latest traffic data to a display or navigation device (not shown). After steps 825, 830, 835, 850, the RDS processing module 610, at step 855, delays a certain time before repeating step 805. Other RDS/RBDS data may also be processed in a similar fashion to the artist and song information and traffic data depending on the type of data.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

Therefore, having thus described the disclosure, at least the following is claimed:

1. A frequency modulation (FM) receiver comprising:

a radio frequency (RF) front-end that receives FM signals and down-converts the received frequency signals to intermediate frequency (IF) signals;

at least one analog-to-digital converter (ADC) that receives the intermediate frequency signals and digitizes multiple FM channels around a desired FM channel associated with the down-converted signals; and multiple sets of digital processing components that are configured to simultaneously receive and process the digitized multiple channels, the multiple sets of digital processing components having at least two parallel channel selection and demodulation paths in which the respective digitized multiple channels are processed therethrough, wherein the multiple sets of digital processing components include a first set of digital processing components having a digital down-converter (DDC), a channel filter and a digital demodulator, the DDC being configured to select and down-convert to baseband a first channel of the digitized multiple channels and pass the selected first channel to the channel filter, the channel filter being configured to remove the image and other unwanted interference on either side of the selected first channel, the digital demodulator being configured to receive the filtered first channel and demodulate information from the filtered first channel, wherein the multiple sets of digital processing components include a second set of digital processing components having a digital down-converter (DDC), a channel filter and a digital demodulator, the DDC being configured to select and down-convert to baseband a second channel of the digitized multiple channels and pass the selected second channel to the channel filter, the channel filter being configured to remove the image and other unwanted interference on either side of the selected second channel, the digital demodulator being configured to receive the filtered second channel and demodulate information from the filtered second channel, wherein the at least one ADC includes first and second narrow-band bandpass analog-to-digital converters that are electrically coupled to the respective first set and second set of digital processing components, the first and second narrow-band bandpass analog-to-digital converters being configured to tune to the first and second channels, respectively.

2. The FM receiver as defined in claim 1, wherein the at least one ADC filters a range of frequencies centered at the intermediate frequency.

3. The FM receiver as defined in claim 1, wherein the at least two parallel channel selection and demodulation paths select and demodulate any two of the digitized multiple FM channels.

4. The FM receiver as defined in claim 1, further comprising multiple sets of radio data system (RDS) processing modules that receive the demodulated FM signals from the multiple sets of digital processing components and decode RDS data associated with the processed multiple channels.

5. A frequency modulation (FM) receiver comprising:

a radio frequency (RF) front-end that receives FM signals and down-converts the received frequency signals to intermediate frequency (IF) signals;

at least one analog-to-digital converter (ADC) that receives the intermediate frequency signals and digitizes multiple FM channels around a desired FM channel associated with the down-converted signals; and multiple sets of digital processing components that are configured to simultaneously receive and process the digitized multiple channels, the multiple sets of digital processing components having at least two parallel channel selection and demodulation paths in which the respective digitized multiple channels are processed therethrough, wherein the multiple sets of digital processing components include a first set of digital processing components having a digital down-converter (DDC), a channel filter and a digital demodulator, the DDC beings configured to select and down-convert to baseband a first channel of the digitized multiple channels and pass the selected first channel to the channel filter, the channel filter being configured to remove the image and other unwanted interference on either side of the selected first channel, the digital demodulator being configured to receive the filtered first channel and demodulate information from the filtered first channel, wherein the multiple sets of digital processing components include a second set of digital processing components having a digital down-converter (DDC), a channel filter and a digital demodulator, the DDC being configured to select and down-convert to baseband a second channel of the digitized multiple channels and pass the selected second channel to the channel filter, the channel filter being configured to remove the image and other unwanted interference on either side of the selected second channel, the digital demodulator being configured to receive the filtered second channel and demodulate information from the filtered second channel, wherein the at least one ADC includes an N-path bandpass ADC that reduces the sampling rate of each path by N relative to the throughput of the ADC.

6. A frequency modulation (FM) receiver comprising:

a radio frequency (RF) front-end that receives FM signals and down-converts the received frequency signals to intermediate frequency (IF) signals:

at least one analog-to-digital converter (ADC) that receives the intermediate frequency signals and digitizes multiple FM channels around a desired FM channel associated with the down-converted signals; and multiple sets of digital processing components that are configured to simultaneously receive and process the digitized multiple channels, the multiple sets of digital processing components having at least two parallel channel selection and demodulation paths in which the respective digitized multiple channels are processed therethrough, wherein the multiple sets of digital processing components include a first set of digital processing components having a digital down-converter (DDC), a channel filter and a digital demodulator, the DDC being configured to select and down-convert to baseband a first channel of the digitized multiple channels and pass the selected first channel to the channel filter, the channel filter being configured to remove the image and other unwanted interference on either side of the selected first channel, the digital demodulator being configured to receive the filtered first channel and demodulate information from the filtered first channel, wherein the multiple sets of digital processing components include a second set of digital processing components having a digital down-converter (DDC), a channel filter and a digital demodulator, the DDC being configured to select and down-convert to baseband a second channel of the digitized multiple channels and pass the selected second channel to the channel filter, the channel filter being configured to remove the image and other unwanted interference on either side of the selected second channel, the digital demodulator being configured to receive the filtered second channel and demodulate information from the filtered second channel; and a channel selectivity module that detects adjacent and alternate channel interference by comparing the received signal strength indication (RSSI) of neighboring channels to the RSSI of the desired channel, where the RSSI is provided by the respective digital demodulators.

7. The FM receiver as defined in claim 6, wherein the channel selectivity module adjusts the digital down-converter and channel filter of the first set of digital processing components to facilitate rejecting at least some portion of the adjacent channel interference associated with the first channel.

8. The FM receiver as defined in claim 7 wherein responsive to the channel selectivity module not sufficiently rejecting the adjacent channel interference, the channel selectivity module cancels the adjacent channel interference by subtracting the adjacent channel interference from the first channel.

9. The FM receiver as defined in claim 6, wherein the channel selectivity module turns off the quadrature path of the first channel in the FM receiver if the ratio of the power in the first channel to the power in any adjacent or alternate channel is above a set threshold.

10. A method for digitizing multiple channels in a frequency modulation (FM) receiver, comprising:

receiving FM signals;

down-converting the received FM frequencies to intermediate frequency signals;

digitizing multiple channels around a desired channel associated with the down-converted signals;

simultaneously processing the digitized multiple channels using at least two parallel channel selection and demodulation paths in which the respective digitized multiple channels are processed therethrough, wherein the step of simultaneously processing the digitized multiple channels comprises selectin and demodulator any two of the digitized multiple channels using the at least two parallel channel selection and demodulation paths, wherein the step of simultaneously processing the digitized multiple channels further comprises: selecting and down-converting to baseband one or more channels of the digitized multiple channels; filtering each of the selected channels at baseband to remove the image and other unwanted interference on either side of selected channels; and demodulating information from the selected and filtered channels; and tuning to the selected channels using respective first and second narrow-band bandpass analog-to-digital converters.

11. The method as defined in claim 10, wherein the step of simultaneously processing the digitized multiple channels comprises selecting and demodulating any two of the digitized multiple channels using the at least two parallel channel selection and demodulation paths.

12. The method as defined in claim 11 wherein the step of simultaneously processing the digitized multiple channels further comprises: selecting and down-converting to baseband one or more channels of the digitized multiple channels; filtering each of the selected channels at baseband to remove the image and other unwanted interference on either side of selected channels; and demodulating information from the selected and filtered channels.

13. The method as defined in claim 12, further comprising reducing the sampling rate of each path by N relative to the throughput of an analog-to-digital converter.

14. The method as defined in claim 10, further comprising receiving the processed multiple channels and simultaneously decoding radio data system (RDS) data associated with the processed multiple channels.

15. A method for digitizing multiple channels in a frequency modulation (FM) receiver, comprising:

receiving FM signals;

down-converting the received FM frequencies to intermediate frequency signals;

digitizing multiple channels around a desired channel associated with the down-converted signals;

simultaneously processing the digitized multiple channels using at least two parallel channel selection and demodulation paths in which the respective digitized multiple channels are processed therethrough, wherein the step of simultaneously processing the digitized multiple channels comprises selecting and demodulating any two of the digitized multiple channels using the at least two parallel channel selection and demodulation paths, wherein the step of simultaneously processing the digitized multiple channels further comprises: selecting and down-converting to baseband one or more channels of the digitized multiple channels; filtering each of the selected channels at baseband to remove the image and other unwanted interference on either side of selected channels; and demodulating information from the selected and filtered channels; and detecting adjacent channel interference by comparing the received signal strength indication (RSSI) of neighboring channels to the RSSI of the desired channel, where the RSSI is provided by the respective digital demodulators; adjusting a digital down-converter and channel filter to facilitate rejecting at least some portion of the adjacent channel interference associated with the selected channels; and responsive to determining that the adjacent channel interference has not been sufficiently rejected, canceling the adjacent channel interference by subtracting the adjacent channel interference from the respective selected channels.

16. The method as defined in claim 15, further comprising turning off the quadrature path of first channel in the FM receiver if the ratio of the power in the first channel to the power in any adjacent or alternate channel is above a set threshold.

17. A receiver comprising:

a radio frequency (RF) front-end that receives FM signals and down-converts the received frequency signals to intermediate frequency signals;

at least one analog-to-digital converter (ADC) that receives the intermediate frequency signals and digitizes multiple FM channels around a desired FM channel associated with the down-converted signals; and multiple sets of digital processing components that are configured to simultaneously receive and process the digitized multiple channels, the multiple sets of digital processing components having at least two parallel channel selection and demodulation paths in which the respective digitized multiple FM channels are processed therethrough, the multiple sets of digital processing components including first and second sets of digital processing components, each having a digital down-converter (DDC), a channel filter and a digital demodulator, the DDCs being configured to select and down-convert to baseband first and second channels of the digitized multiple FM channels and pass the selected first and second channels to the channel filter, the channel filters being configured to remove the image and other unwanted interference on either side of the selected first and second channels, the digital demodulators being configured to receive the respective first and second channels and demodulate information from the respective first and second channels; and a channel selectivity module that detects adjacent and alternate channel interference by comparing the received signal strength indication (RSSI) of neighboring channels to the RSSI of the desired channel, where the RSSI is provided by the respective digital demodulators.

* * * * *